April 4, 1967     G. DIRKS     3,312,963

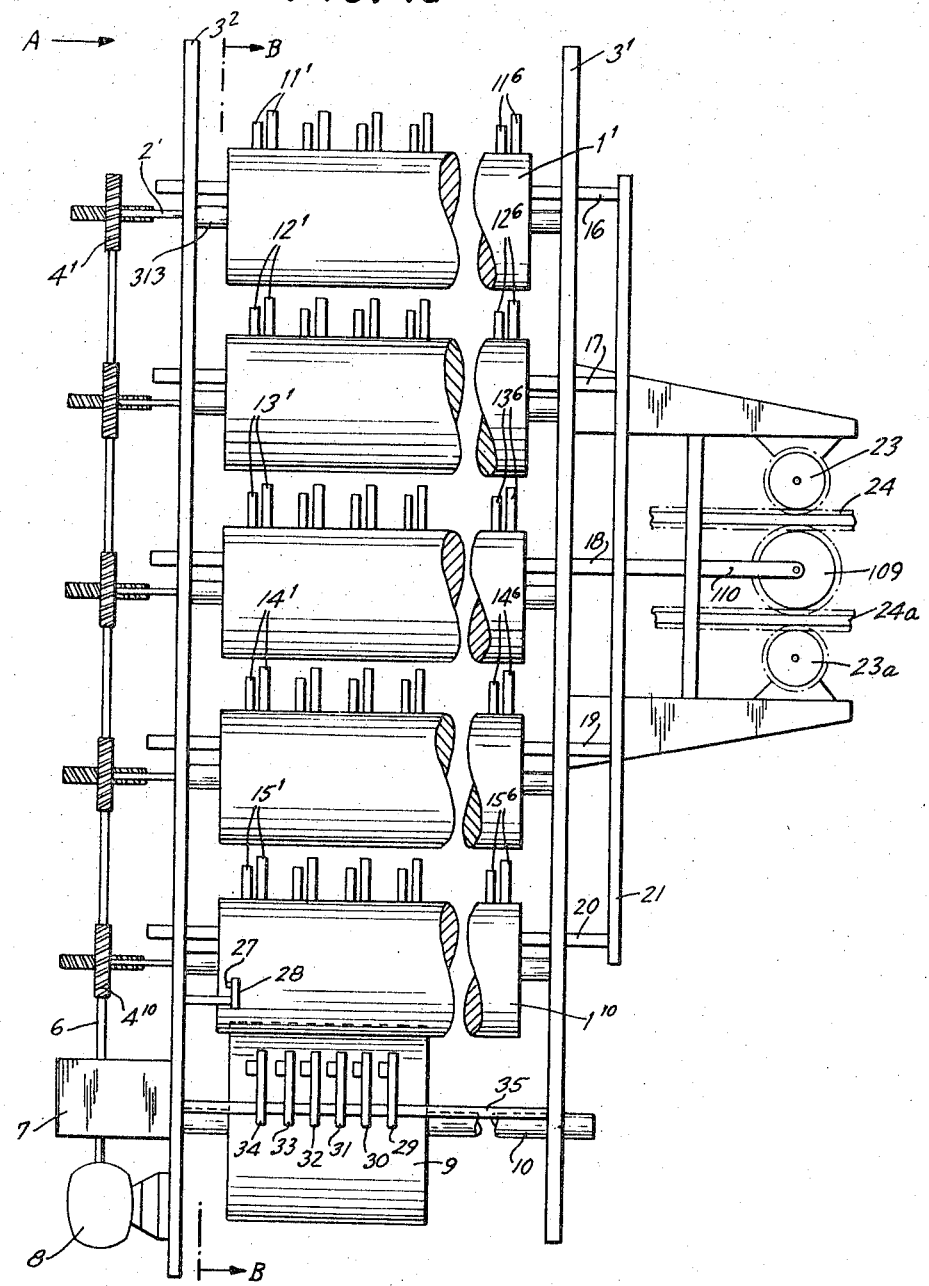

STORAGE DEVICES FOR SIGNALS

Original Filed Oct. 23, 1956     3 Sheets-Sheet 2

INVENTOR.
Gerhard Dirks

BY

April 4, 1967   G. DIRKS   3,312,963
STORAGE DEVICES FOR SIGNALS
Original Filed Oct. 23, 1956   3 Sheets-Sheet 3
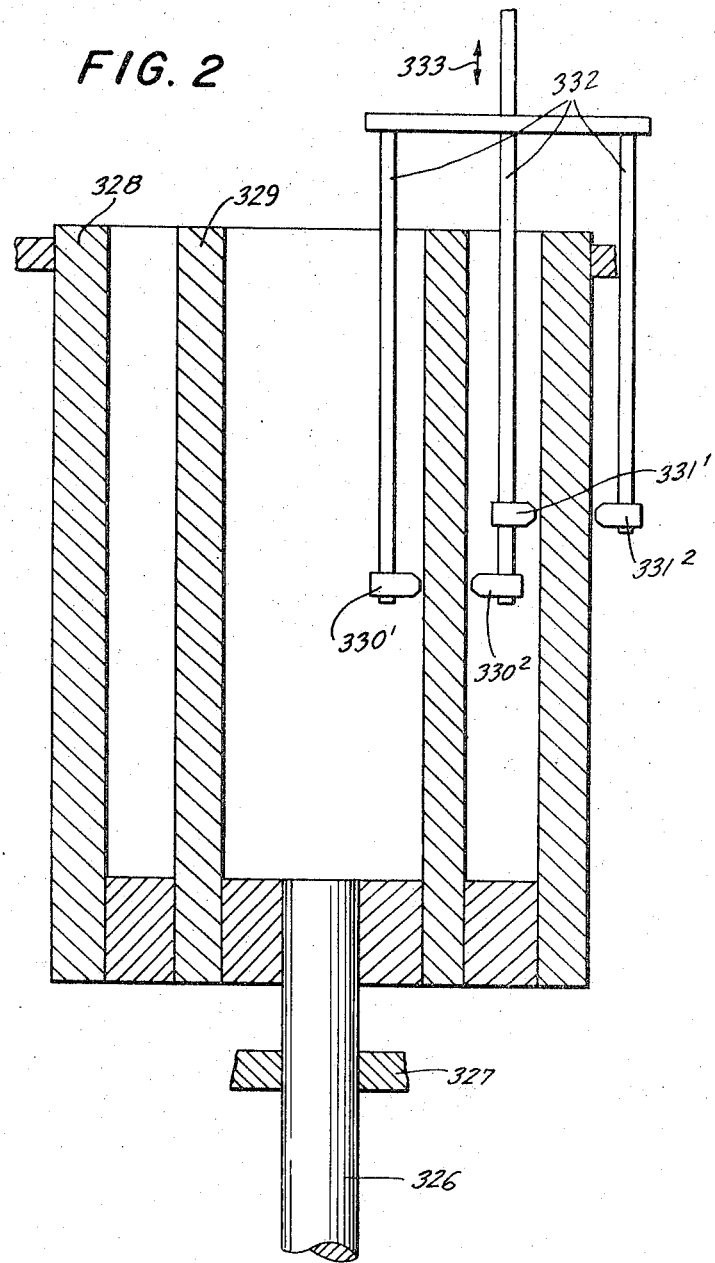
INVENTOR.
Gerhard Dirks
BY
Michael S. Striker United States Patent Office 3,312,963
Patented Apr. 4, 1967

3,312,963
STORAGE DEVICES FOR SIGNALS
Gerhard Dirks, 12120 Edgecliff Place,
Los Altos Hills, Calif. 94022
Application Feb. 19, 1962, Ser. No. 173,908, which is a division of application Ser. No. 617,742, Oct. 23, 1956, now Patent No. 3,049,694 dated Aug. 14, 1962. Divided and this application Oct. 7, 1964, Ser. No. 402,134
Claims priority, application Great Britain, Oct. 25, 1955, 30,413/55; Oct. 28, 1955, 30,860/55; Nov. 23, 1955, 33,509/55
6 Claims. (Cl. 340—174.1)

The present application is a divisional application of pending application, Serial No. 173,908, filed February 19, 1962, now abandoned, and entitled "Storage Devices for Signals," which in turn is a divisional application of pending application, Serial No. 617,742, filed October 23, 1956, now U.S. Patent No. 3,049,694, and entitled "Storage Devices for Signals."

The present invention has for its main object to provide a large capacity signal storage arrangement within a given space volume.

Figure 1C:
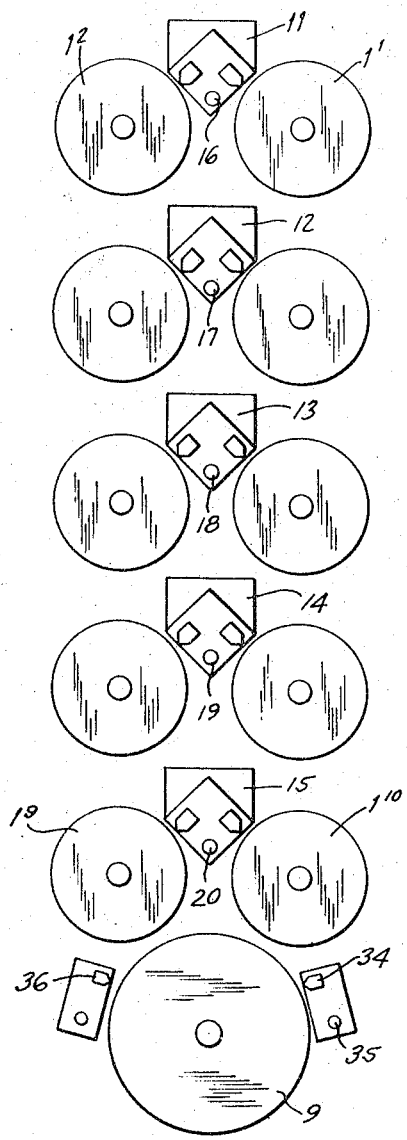
Figure 1B:
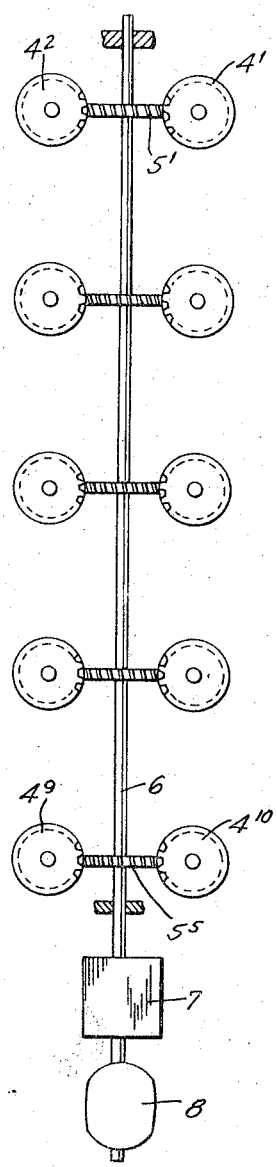

In order that the present invention may be readily carried into effect, it will now be described with reference to the accompanying drawings, wherein:

FIGS. 1a–c show the mechanical structure of an embodiment of a large capacity storage arrangement with a plurality of magnetizable drums in a supporting frame; and in which FIG. 1a is a front view, FIG. 1b is a side view, FIG. 1c is a section view taken on line B—B of FIG. 1a; and FIG. 2 shows an alternative structural form of a large capacity storage arrangement.

Referring now to FIGS. 1a–c, FIG. 1a shows a front view of the large capacity storage arrangement whereas the FIGS. 1b and 1c show side views. As shown by arrows in FIG. 1a, FIG. 1b shows an exterior side view, whereas FIG. 1c shows a cross section along line B.

The storage drums $1^{1-10}$ are each mounted on corresponding shafts $2^{1-10}$ rotatably held within the supporting frame including parts $3^{1-2}$. The storage drums are driven by the gears $4^{1-10}$, which are in mesh with the driving gears $5^{1-5}$. The driving gears $5^{1-5}$ are mounted on a common shaft 6 which is driven through gear assembly 7 by motor 8. The storage drum 9 constitutes an intermediate storage between input for effecting signal transfer to and from the storage drums $1^{1-10}$.

The intermediate storage drum 9 is mounted on shaft 10 which is rotatably supported between the frame parts $3^{1-2}$ and driven by gear assembly 7. The gear assembly 7 drives the storage drums $1^{1-10}$ and the intermediate storage drum 9 at different but proportional speeds which may be of the ratio 1–50; that is the intermediate storage drum 9 rotates at a speed higher by 50 times than the rotational speed of the storage drums $1^{1-10}$ so that the groups of words may be recorded in a track of the storage drums $1^{1-10}$ as described later. The rotation speed of the intermediate storage drum may be, e.g. 6000 r.p.m., whereas the speed of the storage drums themselves may be 120 r.p.m. Recording and sensing of these words on the tracks of the storage drums $1^{1-10}$ is effected by recording through signal heads cooperating with the surfaces of storage drums $1^{1-10}$, which heads are mounted on the corresponding signal head-holders $11^{1-6}$, $12^{1-6}$, $13^{1-6}$, $14^{1-6}$ and $15^{1-6}$. These signal head-holders and their supporting frame are shown in more detail in FIGURES 2a and 2b.

In order to select any wanted track on the storage drums $1^{1-10}$ for sensing or recording the signal head-holders $11^{1-6}$ to $15^{1-6}$ are shifted parallel to the axis of their adjacent storage drum. The shifting is effected by an intermittent drive to driving pinions 23 and 23a for axially moving racks 24 and 24a. A differential pinion 109 between racks 24 and 24a is fixedly secured to link 110 which is in turn attached to a bar 21 carrying supporting rods 16, 17, 18, 19 and 20. The supporting rods 16–20 therefore move together to hold the signal head-holders $11^{1-6}$ to $15^{1-6}$ in desired position.

FIGURE 1a shows furthermore the sensing head 27 which senses zero position indicating signals from storage drum $1^{10}$. This sensing head 27 is secured to angle bracket 28 attached to frame part $3^2$. The signal heads 29, 30, 31, 32, 33 and 34 are mounted on the supporting arm 53 attached between the frame parts $3^1$ and $3^2$, and are spaced by an air gap when they are used for the sensing or recording of signals on intermediate storage drum 9. During sensing, the signals sensed on the intermediate storage drum 9 are transferred by circuitry described later and recorded on storage drums $1^{1-10}$. The permanent zero indicating signals may be generated by the head 27 sensing a thin permanent magnet in a slot in a non-magnetic part of the drum $1^{10}$ or the head and magnet may be replaced by a photo-electric cell and an optically readable mark on the drum $1^{10}$.

FIG. 2 shows another form of a large capacity storage arrangement in which around shaft 326 held in a bearing 327 are arranged rotatable magnetizable cylinders 328, 329 which have magnetizable surfaces within the interior of the drum as well as on the exterior. Movable signal heads $330^1$ and $330^2$ are shown for the inner cylinder as well as signal heads $331^1$ and $331^2$ for the outside cylinder. The signal heads may be moved by shifting the frame 332 to and fro in arrow directions 333. The frame 332 is positioned by an arrangement similar to that used for the rod 110 shown in FIG. 1a.

The shaft may be arranged vertically in order to simplify the arrangement. The signal head-holders may be tubes coaxially arranged within the cylindrical drums. Such tubes may also be used as counter bearings for the whole arrangement.

There may be more than one intermediate storage, for example, two drums, and these may be arranged for alternate operation for recording and sensing.

There may also be more than one arrangement of shiftable signal heads so that the one may be adjusted for the next selection while the other is operative in a preceding sensing or recording. The intermediate storage could have a plurality of shiftable or selectively-switchable groups of signal heads so that an intermediate storage may deal with information in more than one group of tracks.

The intermediate storage may be used for computing purposes, for example the drum may also comprise part of the arithmetic unit of a computer.

What I claim is:
1. In data signal storage apparatus, in combination, supporting means; a plurality of signal storing drums mounted coaxially in said supporting means and comprising hollow cylinders of different diameters mounted within one another with the outer surface of each in spaced relation from the inner surface of the next adjacent one, at least said inner surfaces of said cylinders being signal storage surfaces; driving means coupled to said drums to rotate them in synchronism; and transducing means mounted to cooperate with said inner storage surface of each of said cylinders.

2. In data signal storage apparatus, in combination, supporting means; a pair of signal storing drums mounted coaxially in said supporting means, said drums comprising an outer hollow cylinder and an inner cylinder of different diameters mounted within said outer cylinder with the outer surface of said inner cylinder in spaced relation from the inner surface of said outer cylinder, at least said inner surface of said outer cylinder and said outer surface of said inner cylinder being signal storage surfaces; driving means coupled to said drums to rotate them in synchronism; and transducing means mounted to cooperate with said signal storage surface of each of said cylinders.

3. Data signal storage apparatus comprising, in combination; a frame; a signal storing drum mounted in said frame and comprising a hollow cylinder having an inner surface and an outer surface, at least said inner surface being a signal storage surface; driving means coupled to said drum to rotate it; a transducing assembly mounted to cooperate with the inner storage surface of said drum; carrier means carrying said transducing assembly; means normally operative to retain said transducing assembly in an ineffective position in which it is spaced from the inner storage surface of said drum; and control means connected to said transducing assembly and being operable to move said transducing assembly in a direction toward the inner storage surface of said drum to bring said transducing assembly to an effective transducing position.

4. Data signal storage apparatus, comprising, in combination, a frame; a plurality of signal storing drums mounted coaxially in said frame, and comprising an outer hollow cylinder and an inner cylinder mounted within said outer hollow cylinder surface of said inner cylinder in spaced relation from the inner surface of said outer cylinder, at least said surfaces being signal storing surfaces; a common driving shaft coupled to said drums to rotate them in synchronism; individual transducing assemblies for each of said drums mounted to cooperate with said signal storage surface of each of said cylinders; a common carrier carrying said transducing assemblies; means normally operative to retain each of said transducing assemblies in an ineffective position in which it is spaced from the surface of the corresponding one of said cylinders; and control means connected to said transducing assemblies and being operable to move a selected transducing assembly in a direction toward the inner storage surface of the corresponding, cylinder to bring the selected transducing assembly to an effective transducing position.

5. Data signal storage apparatus comprising, in combination, a frame; a pair of signal storing drums mounted coaxially in said frame, and comprising hollow cylinders of different diameters mounted one within the other with the outer surface of the inner one of said drums in spaced relation from the inner storage surface of the outer one of said drums, at least said inner surfaces of said hollow cylinders being signal storage surfaces; a common driving shaft coupled to said drums to rotate them in synchronism; individual transducing assemblies for each of said drums mounted to cooperate with the inner storage surface of each of said drums; a common carrier carrying said transducing assemblies; means normally operative to retain each of said transducing assemblies in an ineffective position in which it is spaced from the surface of the corresponding one of said cylinders; and control means connected to said transducing assemblies and being operable to move a selected transducing assembly in a direction toward the inner storage surface of the corresponding cylinder to bring the selected transducing assembly to an effective transducing position.

6. A magnetic storage device comprising a drive shaft, a supporting member mounted on said drive shaft, a plurality of hollow cylinders arranged in concentric spaced relationship around said shaft, each of said cylinders having two extremities and an inner and an outer periphery, each of said cylinders being supported at one of its extremities by said supporting member, each of said cylinders further being provided with a coating of magnetizable material on its inner and outer periphery, and drive means to rotate said drive shaft about its axis.

References Cited by the Examiner
UNITED STATES PATENTS

| | | | |
|---|---|---|---|
| 2,153,917 | 4/1939 | Exline | 346—138 |
| 2,229,293 | 1/1941 | Huntley et al. | 274—41.4 |
| 2,800,642 | 7/1957 | May | 340—174.1 |
| 2,820,688 | 1/1958 | Philbrick | 179—100.2 |
| 3,145,386 | 8/1964 | Wadey | 346—74 |

BERNARD KONICK, *Primary Examiner.*

IRVING L. SRAGOW, *Examiner.*

V. P. CANNEY, R. J. McCLOSKEY, A. BERNARD,
*Assistant Examiners.*